United States Patent
Chateau et al.

(10) Patent No.: US 7,835,391 B2
(45) Date of Patent: Nov. 16, 2010

(54) PROTOCOL DMA ENGINE

(75) Inventors: Alain Chateau, Cagnes sur Mer (FR); Lars Holst Christensen, Aalborg (DK); Bent Rysgaard, Aalborg (DK)

(73) Assignee: Texas Instruments Incorporated, Dallas, TX (US)

( * ) Notice: Subject to any disclaimer, the term of this patent is extended or adjusted under 35 U.S.C. 154(b) by 339 days.

(21) Appl. No.: 11/862,366

(22) Filed: Sep. 27, 2007

(65) Prior Publication Data

US 2008/0219159 A1      Sep. 11, 2008

(30) Foreign Application Priority Data

Mar. 9, 2007    (EP) ................... 07290302

(51) Int. Cl.
*H04J 3/24* (2006.01)
*H04J 3/14* (2006.01)

(52) U.S. Cl. .............. 370/466; 370/469; 370/474; 370/476

(58) Field of Classification Search ......... 370/229–238, 370/464–467, 469, 474–477
See application file for complete search history.

(56) References Cited

U.S. PATENT DOCUMENTS

| | | | |
|---|---|---|---|
| 6,489,902 B2 * | 12/2002 | Heath ........................... 341/87 |
| 6,963,921 B1 * | 11/2005 | Yang et al. .................. 709/230 |
| 7,167,474 B2 * | 1/2007 | Sugai et al. ................. 370/392 |
| 7,200,695 B2 * | 4/2007 | Rosner ......................... 710/52 |
| 7,225,278 B1 * | 5/2007 | Baxter et al. .................. 710/22 |
| 7,548,532 B2 * | 6/2009 | Krischer et al. ............. 370/338 |
| 7,664,889 B2 * | 2/2010 | Vemula et al. ................ 710/22 |
| 2004/0111535 A1 | 6/2004 | Boucher et al. |
| 2004/0160983 A1 * | 8/2004 | Kuskin et al. ............... 370/471 |
| 2006/0015651 A1 | 1/2006 | Freimuth et al. |
| 2006/0031602 A1 | 2/2006 | Ellis et al. |
| 2006/0045090 A1 * | 3/2006 | Ronciak et al. ............. 370/392 |
| 2008/0253395 A1 * | 10/2008 | Pandya ....................... 370/469 |

FOREIGN PATENT DOCUMENTS

WO    0129656 A2    4/2001

* cited by examiner

*Primary Examiner*—Tri H Phan
(74) *Attorney, Agent, or Firm*—Ronald O. Neerings; Wade James Brady, III; Frederick J. Telecky, Jr.

(57) ABSTRACT

Apparatus and method for accelerating data handling in the protocol stack of a networked device. Embodiments of the disclosed invention may be used to increase the throughput rate of a networked device while offloading processing from the device's host processor. A method includes building a set of descriptors that describe the operations to be performed by a Protocol DMA Engine. A host processor builds the set of descriptors in lieu of performing the operations described by the descriptors. The set of descriptors is provided to the Protocol DMA Engine. The Protocol DMA Engine executes the operations described in the set of descriptors to produce a protocol layer output data unit from a protocol layer input data unit. The protocol layer output data unit is provided to a next layer of a network protocol stack.

15 Claims, 4 Drawing Sheets

PROTOCOL DMA ENGINE

CROSS-REFERENCE TO RELATED APPLICATIONS

The present application claims priority to and incorporates by reference European patent application No. 07290302.4, filed on Mar. 9, 2007

BACKGROUND

With the proliferation of modern wireless technologies, networked devices have become nearly ubiquitous. Networked devices often employ a multi-layered protocol architecture to simplify communications. The layers serve to isolate each function to a particular hierarchical system, thereby isolating other systems within the protocol hierarchy from the details of functionalities implemented in disparate layers.

Network protocol layering is often based on the Open Systems Interconnection Model ("OSI"), as specified in ITU-T Recommendation X.200. The OSI model specifies seven protocol layers traversed by data as it passes between the transmission media and the relevant application. Each layer may copy the data received from the previous layer, and pass a modified version of the data to the subsequent layer for further processing.

The first and lowest layer of a protocol stack is often termed the "physical" layer. The physical layer provides the network device with means to access the physical media interconnecting devices, and to transmit and receive bit streams via that media.

The data link layer resides atop, and is serviced by, the physical layer of the network stack. The data link layer may provide a variety of services to higher levels, and therefore comprise a number of functionalities. Representative data link layer functionalities include: error correction by automatic retransmission request, ciphering and deciphering of data units, and segmentation and reassembly of data units. The data link layer may be further sub-divided into a number of sub-layers to implement the required functionalities. Each sub-layer receives data from the previous sub-layer, processes the data, and passes the processed data to the next sub-layer for further processing. Sub-layer processing may include copying, as well as other manipulations of the data.

The network layer (layer 3) is located above the data link layer. The network layer provides for connection establishment and release between communicating applications. A wide variety of other functions, such as routing and relay services, may reside at the network layer. The internet protocol is a well known example of a network layer protocol.

With wireless network speeds increasing dramatically, from 10-100 Kbps in 2G networks, to 1-10 Mbps in 3G networks, to 100 Mbps in 4G networks, the host processor of a network device struggles to perform the data manipulations required by the various protocol layers in real-time. General purpose processors tend to be inefficient in regard to bit level processing and data copying, and consequently, have difficulty supporting the throughput levels required by elevated data rates. Therefore, an improved means of protocol processing is needed.

SUMMARY

Accordingly, there are herein disclosed techniques for employing a Protocol DMA Engine to accelerate protocol layer processing. In accordance with at least some embodiments a method includes building a set of descriptors that describe the operations to be performed by a Protocol DMA Engine. A host processor builds the set of descriptors in lieu of performing the operations described by the descriptors. The set of descriptors is provided to the Protocol DMA Engine. The Protocol DMA Engine executes the operations described in the set of descriptors to produce a protocol layer output data unit from a protocol layer input data unit. The protocol layer output data unit is provided to a next layer of a network protocol stack for further processing.

In other embodiments, an apparatus includes a Protocol DMA Engine that processes a protocol layer input data unit to produce a protocol layer output data unit. The Protocol DMA Engine transfers data directly from the input data unit to the output data unit, and may cipher or decipher data, and/or compress or decompress data to produce the output data unit. The apparatus further includes a host processor that produces a descriptor. The descriptor describes the operations to be performed by the Protocol DMA Engine to produce the protocol layer output data unit from the protocol layer input data unit.

In yet other embodiments, apparatus includes a DMA Controller that moves at least a portion of an input protocol data unit from a first memory location into an output protocol data unit at a second memory location for protocol stack processing. The apparatus also includes a memory interface component, a cipher/decipher component, and a compress/decompress component. The memory interface component is coupled to the DMA Controller, and provides access to a memory device. The cipher/decipher component is coupled to the memory interface component, and either encrypts or decrypts at least a portion of a protocol data unit for protocol stack processing. The compress/decompress component is also coupled to the memory interface component, and either compresses or decompresses at least a portion of a protocol data unit for protocol stack processing.

Notation and Nomenclature

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

BRIEF DESCRIPTION OF THE DRAWINGS

In the following detailed description, reference will be made to the accompanying drawings, in which.

The drawings show illustrative embodiments that will be described in detail. However, the description and accompanying drawings are not intended to limit the claimed invention to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for accelerating data handling in the protocol stack of a networked device. Embodiments of the disclosed invention may be used to increase the throughput rate of a networked device while offloading processing from the device's host processor. The disclosed embodiments include apparatus for data processing in the various layers of a network protocol stack, and a method for improving protocol processing by employing a Protocol DMA Engine to perform protocol stack operations. While embodiments of the invention are described primarily in the context of a wireless network, embodiments are also applicable to accelerating protocol processing in network devices employing wire, optical, or other interconnections.

Figure 1:
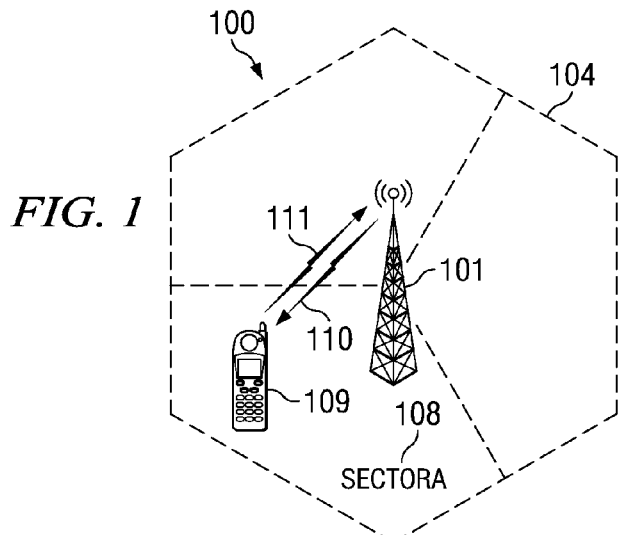
FIG. 1 shows an illustrative wireless network in accordance with embodiments of the invention.

FIG. 1 shows an illustrative wireless telecommunications network 100. The illustrative wireless telecommunications network includes base station 101, though in practice, a wireless telecommunications network may include more base stations and mobile terminals than illustrated. A base station may also be known as a fixed access point, a Node B, etc. Base station 101 is operable over cell 104. The cell 104 is further divided into sectors. In the illustrated network, the cell 104 is divided into three sectors. Cellular telephone or other user equipment ("UE") 109 is shown in sector A 108, which is within cell 104. The UE may also be called a mobile terminal, a mobile station, etc. Base station 101 transmits to UE 10 via down-link 110, and receives transmissions from UE 109 via up-link 111.

Message transfer between base station 101 and UE 109 is facilitated by multi-layer protocol stacks. Execution of the protocol stacks is one factor constraining transfer rates between base station 101 and UE 109. As advances in radio technology enable higher transfer rates, base station 101 and UE 109 processing must accommodate the higher processing load. The UE 109 host processor has difficulty sustaining the computing effort required to service the various protocol layers at elevated network link speeds. For example, some host processors may be unable to sustain data link layer processing at network link rates at or above 10 Mbps. The disclosed embodiments accelerate protocol layer processing with all host processors, and are therefore not limited in application to any particular host processor. UE 109 preferably employs a Protocol DMA Engine, as disclosed herein, to offload protocol processing from the host processor and enable UE 109 to service the protocol stack when operating at elevated link transfer rates.

Figure 2:
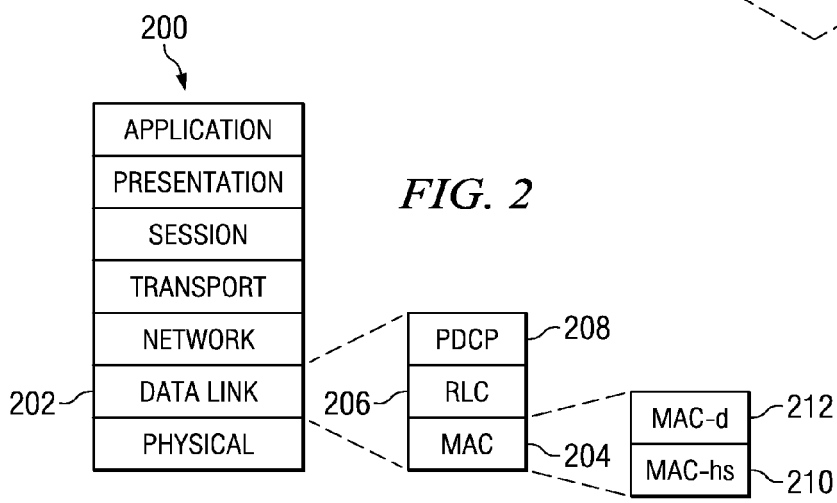
FIG. 2 shows an illustrative protocol stack and illustrative sub-layers of the data link layer of the protocol stack in accordance with embodiments of the invention.

FIG. 2 shows an illustrative seven layer protocol stack 200. The various layers of the stack may be further divided in sub-layers. As illustrated, the data link layer 202 of the protocol stack may be further sub-divided into multiple sub-layers as prescribed by, for example, the Universal Mobile Telecommunications System ("UMTS"), a third generation mobile phone technology. In FIG. 2 the data link layer 202 comprises a Media Access Control ("MAC") sub-layer 204, a Radio Link Control ("RLC") sub-layer 206, and a Packet Data Convergence Protocol ("PDCP") sub-layer 208. Moreover, the MAC sub-layer 204 further comprises a "MAC-d" entity 212 and a "MAC-hs" entity 210 that implement UMTS High Speed Downlink Packet Access ("HSDPA"), to enhance UMTS performance. These MAC entities 210, 212 operate as MAC sub-layers for purposes of describing data link layer processing. Note that the data link layer 202 may comprise various other sub-layers not illustrated here, and the invention of the present disclosure is intended to accelerate processing across all protocol stack layers and the associated sub-layers.

Servicing the protocol stack layers, for example, the data link layer 202 requires a substantial amount of data packet manipulation and intensive bit level data processing. The above mentioned sub-layers of the data link layer may, for example, add/remove headers, encrypt/decrypt payloads, segment/reassemble data blocks, concatenate data units, pad data units, compress/decompress headers, etc. These are examples of operations that may be offloaded from the host processor to the Protocol DMA Engine to accelerate protocol stack processing.

Figure 3:
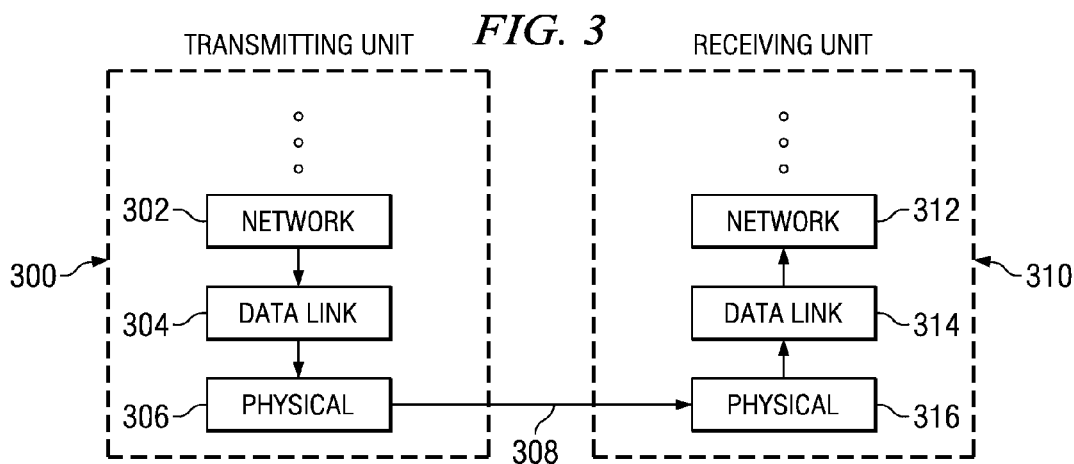
FIG. 3 shows as an illustrative transfer between wireless devices including protocol stacks in accordance with embodiments of the invention.

FIG. 3 shows an illustrative transfer between wireless devices including protocol stacks in accordance with embodiments of the invention. A message originates in the network layer 302 (layer 3), or possibly a layer above the network layer 302 of transmitting unit 300. The message is passed down to layer 2, the data link layer 304, for processing in the various sub-layers. For example, PCDP sub-layer processing may comprise internet protocol ("IP") header compression and addition of PDCP headers. RLC sub-layer processing may comprise data encryption, to enhance network security, segmentation, the decomposition of the PCDP data unit into multiple RLC data units when the PDCP data unit is larger than the RLC data unit, and addition of RLC headers. MAC sub-layer processing may comprise assembling multiple RLC data units into a larger MAC data unit, prefixing a header to the data unit, and encrypting the data. MAC sub-layer data units are delivered to the physical layer 306 for transmission via media 308 to the receiving unit 310.

The protocol stack of receiving unit 310 reverses the processing applied in the protocol stack of transmitting unit 300 to reconstruct the message passed from network layer 302 to the data link layer of transmitting unit 300. Error correction techniques may also be applied in the sub-layers of the data link layer 314 to ensure error free delivery of data units.

Note that while the present disclosure primarily discusses application of the Protocol DMA Engine from the perspective of processing a received data block, this view is adopted merely because down-link data rates are generally higher than up-link data rates, thus emphasizing the advantages of accelerated protocol processing in accordance with the embodiments of the present disclosure. Application of the Protocol DMA Engine to accelerate data link layer processing applies to both up-link and down-link processing.

Figure 4:
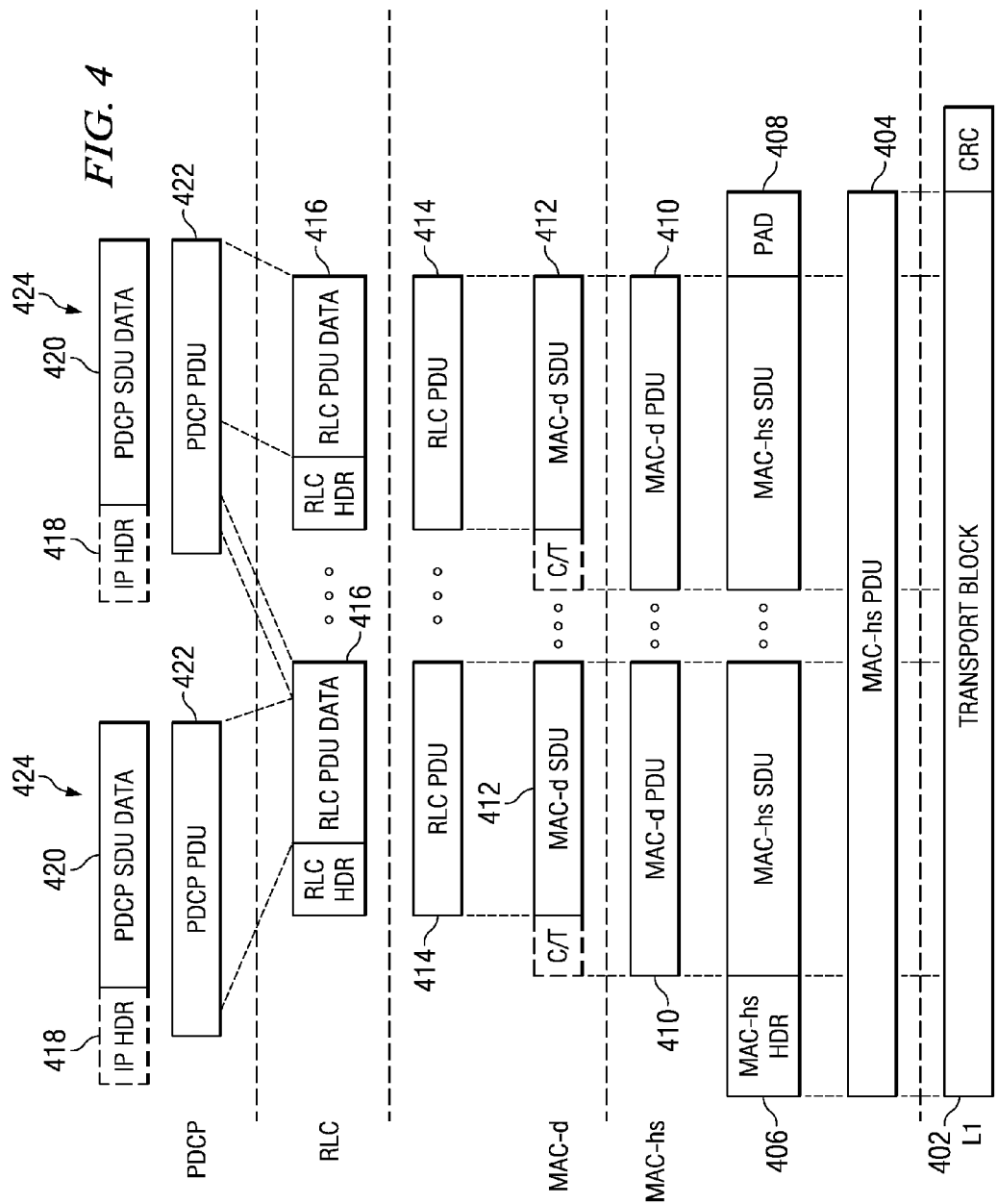
FIG. 4 shows an illustrative example of received transport block decomposition in the data link layer in accordance with embodiments of the invention.

FIG. 4 shows an illustrative example of received transport block decomposition in the data link layer in accordance with embodiments of the invention. This example illustrates reception of a data block via the high-speed download shared channel (HS-DSCH), the channel implementing High Speed Downlink Packet Access ("HSDPA") between a base station and UE. The MAC-hs protocol data unit ("PDU") 404 is extracted from the transport block 402 in the protocol physical layer and passed up to the MAC-hs sub-layer of the data link layer. Forward error correction ("FEC") is applied to the MAC-hs PDU and the block is acknowledged ("ACK'd") or not-acknowledged ("NACK'd") depending on whether all detected errors were correctable. NACKing the block requests retransmission by the transmitting unit. An error-free MAC-hs PDU 404 is reordered according to the transmission sequence number ("TSN") field of the MAC-hs header 406 to insure that received MAC-hs PDUs 404 are disassembled in the proper sequence.

The host processor parses the MAC-hs header 406 to determine the content of the PDU 404. In accordance with preferred embodiments of the invention, the host processor allocates descriptors delineating the processing and decomposition of the PDU 404 into a PDCP PDU 422 and the associated PDCP SDU 424. Multiple MAC-hs PDUs may be required to construct a PDCP PDU 422. The host processor monitors received PDUs to determine when adequate data has been received to construct a PDCP PDU 422. Headers added at each sub-layer are parsed build the descriptors. A Protocol DMA Engine executes the descriptors to construct a PDCP PDU 422.

In contrast, an embodiment lacking a Protocol DMA Engine may disassemble the MAC-hs PDU 404 to extract the MAC-d PDUs 410 and transfer the extracted MAC-d PDUs 410 to the MAC-d sub-layer. In the MAC-d sub-layer, the payload portion, the service data unit ("SDU") 412, of the MAC-d PDUs 410 passed up from the MAC-hs sub-layer may be deciphered (decrypted). The decrypted RLC PDUs 414 may be delivered to the RLC sub-layer for further processing.

In accordance with the preferred embodiments, when employing a Protocol DMA Engine, cipher relevant parameters may be added to the descriptors and decryption performed when the Protocol DMA Engine executes the descriptors. Depending on transmission mode, deciphering may be performed at the RLC PDU level (data only is deciphered) or at the MAC-d SDU level. In either case decryption, like all other Protocol DMA Engine processing, is performed only when transferring data units to a next layer. Because the Protocol DMA Engine may perform processing required by the various protocol stack layers, the next layer to which a data unit is passed may be any layer of the protocol stack. Embodiments of the Protocol DMA Engine are intended to perform processing functions required to allow data unit transfers between the lowest and the highest layers of the protocol stack.

On transfer of an RLC PDU to the RLC sub-layer, the host processor of an embodiment sans a Protocol DMA Engine may be burdened with deciphering the RLC PDU data 416 and reassembling RLC SDUs from the RLC PDU data 416. When all RLC PDUs 414 composing an RLC SDU have been received, and the RLC SDU has been reassembled, the RLC SDU may be delivered to the upper sub-layer.

The host processor may perform control operations, such as automatic-repeat-request ("ARQ") for requesting retransmission of missing RLC PDUs in embodiments with or without the Protocol DMA Engine.

The descriptors may direct the Protocol DMA Engine to decompress IP headers 418 included in PDCP SDU 424, which also includes data 420, when the PDCP SDUs are constructed. Header decompression may be performed in accordance with RFC 2507 or RFC 3095 as selected by the upper layer. A PDCP SDU 424 may be reassembled by gathering data segments from multiple RLC PDU data fields 416. In an embodiment without a Protocol DMA Engine, the host processor may be responsible for performing these functions.

FIG. 4 illustrates how a Protocol DMA Engine capable of performing the data movement and processing operations required by, for example, the data link layer reduces host processor loading and accelerates protocol stack processing. Data link layer processing of a MAC-hs PDU 404 may be reduced to host processor construction of descriptors to direct a Protocol DMA Engine, and Protocol DMA Engine execution of the descriptors when ready to build a PDCP SDU 424. Based on the descriptors, the Protocol DMA Engine may build a PDCP SDU 424 directly from a MAC-hs PDU 404 by gathering the required data and performing decryption and decompression operations in the process.

The up-link process is similar, although an alternate MAC entity is substituted for the MAC-hs entity in the up-link MAC sub-layer. As PDCP SDUs are received in the data link layer, the host processor allocates descriptors that will be passed to the Protocol DMA Engine to construct a MAC PDU for transfer to the physical layer. The descriptors may instruct the Protocol DMA Engine to compress the IP headers associated with the PDCP SDUs, to attach the supplied headers as required for each sub-layer, to segment the PDUs, to encrypt data fields, etc. When sufficient PDCP SDUs are accumulated and the descriptors are built, the host processor passes the descriptors to the Protocol DMA Engine which in turn constructs the MAC PDU that is transferred to the physical layer.

Various embodiments of the invention accelerate protocol stack processing by moving low level data link layer processing to a Protocol DMA Engine. The Protocol DMA Engine performs the numerous data packet manipulations, such as segmentation, reordering and reassembly, required by the protocol layers. The Protocol DMA Engine also performs the intensive bit-level processing required for header coding and decoding, bit and byte alignment, and cryptography. With transfer of these operations to the Protocol DMA Engine, the host processor contribution to protocol stack processing is reduced to configuring the DMA engine.

The host processor configures the Protocol DMA Engine through descriptors that direct Protocol DMA Engine processing. Thus, the computing load of the host processor becomes loosely coupled to the protocol stack data rate, and the system is adaptable to future increases in wireless data rates. The combination of host built descriptors and Protocol DMA Engine collapse the successive data processing stages corresponding to the various layers and sub-layers of the protocol stack into a single process executed when data is to be transferred to a next layer. The descriptors executed by the Protocol DMA Engine contain information describing the data units passing through the relevant layer or layers, and how the data units are to be processed. This information includes, for example, data unit memory location, data unit format, processing attributes, and location of a pointer to a next data unit. When the host processor has constructed a set of descriptors, the descriptors are transferred to the Protocol DMA Engine. The Protocol DMA Engine then executes, on each data unit, the various copy and transform operations specified in the corresponding descriptor.

Figure 5:
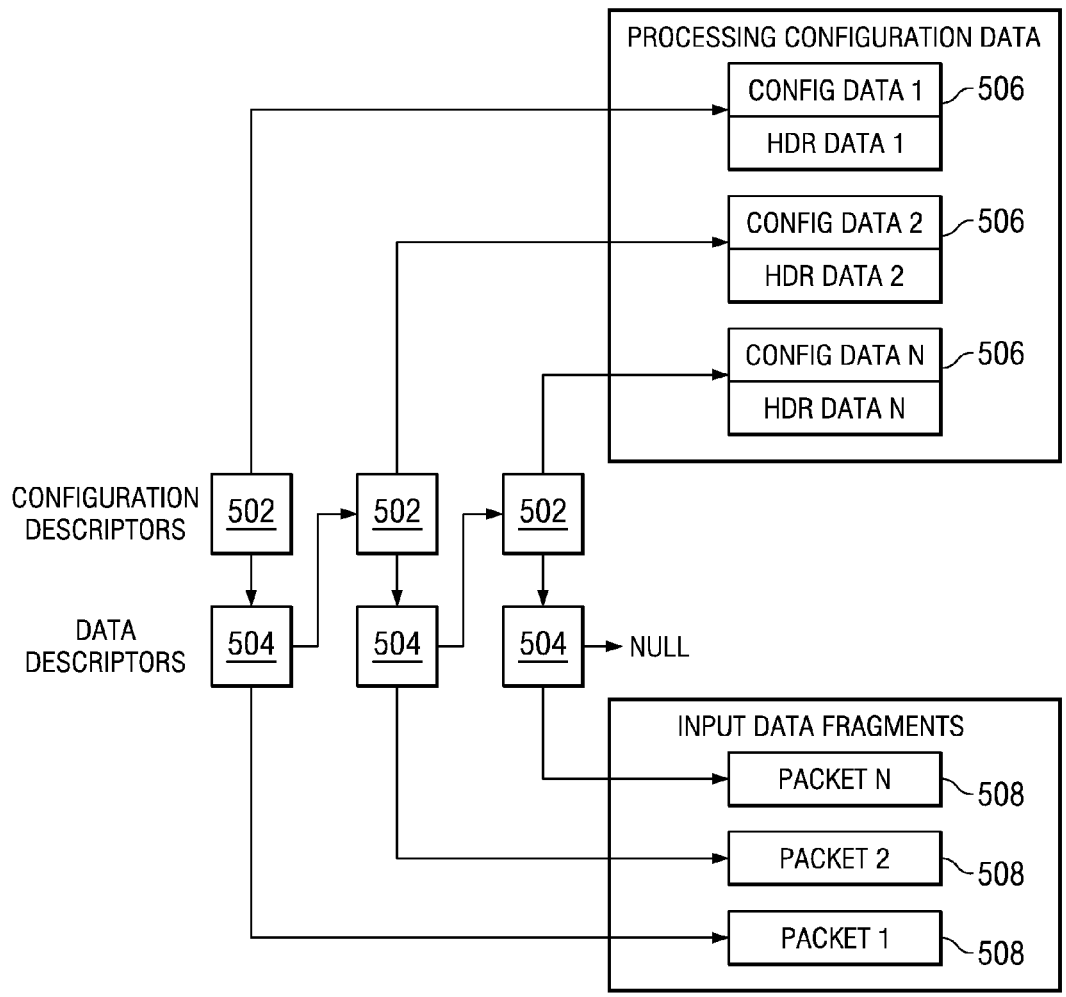
FIG. 5 shows an illustrative linked list of descriptors pointing to processing configuration and data units for manipulation by the Protocol DMA Engine in accordance with preferred embodiments of the invention.

FIG. 5 shows an illustrative linked list of descriptors comprising configuration descriptors 502 pointing to processing configuration 506 and data descriptors 504 pointing to data units 508 to be processed by the Protocol DMA Engine in accordance with preferred embodiments of the invention. Each configuration descriptor 502 points to a set of instructions, configuration data 506, that controls how the Protocol DMA Engine manipulates the associated data packets 508. As illustrated, the configuration data 506 is kept separate from the data 508 itself. The configuration data 506 can also apply to multiple data packets 508. Optional header data or other metadata may be associated with the configuration data 506, if, for example, the desired processing includes prefixing a header to the data. The host processor builds the descriptor linked list as the data packets are delivered to, for example, the data link layer, where the Protocol DMA Engine is to perform data link layer processing. Upon receipt of sufficient data packets to constitute a next layer data unit (the next layer may be a higher or lower layer depending on the direction of data packet flow), the host processor passes the descriptor list to the Protocol DMA engine. When the Protocol DMA Engine receives the descriptor list it successively manipulates each data packet 508 pointed to by a data descriptor 504 in accordance with the operations specified by the associated configuration descriptor 502. Thus, the protocol stack processing is reduced from a set of successive copy and manipulation operations performed at the various layers and associated sub-layers to a single processing stage orchestrated by a descriptor list and performed only when data is to be transferred to a next layer.

Figure 6:
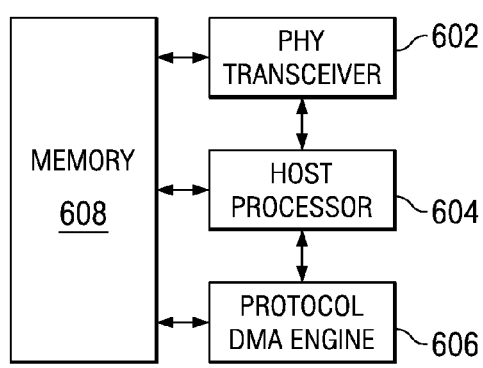
FIG. 6 shows a block diagram of an illustrative network device including the Protocol DMA Engine in accordance with preferred embodiments of the invention.

FIG. 6 shows a block diagram of an embodiment of a network device including the Protocol DMA Engine in accordance with preferred embodiments of the invention. The embodiment comprises a transceiver module 602 that transmits and receives data via a transmission media. Transceiver 602 may comprise a digital signal processor ("DSP") with associated software, and radio frequency or other media access circuits. Transceiver 602 may also comprise a variety of other circuits fixed or programmable.

The transceiver 602 is coupled to a host processor 604 that performs a variety of control and data processing tasks. The host processor 604 may comprise one or more processors or DSPs with associated software.

The Protocol DMA Engine 606 is coupled to the host processor 604. In accordance with the present disclosure, the Protocol DMA Engine 606 performs data movement and manipulation associated with the various layers and sub-layers of the protocol stack. The Protocol DMA Engine 606 may comprise a set of logic circuits configured to perform the specific functions of the DMA engine, such as a DMA controller supporting scatter/gather functionality, encryption/decryption circuits, and compression/decompression circuits. The Protocol DMA Engine 606 may also comprise a processor and associated software, or a combination of a processor and fixed or programmable circuitry.

Memory 608 is coupled to transceiver 602, host processor 604, and Protocol DMA Engine 606. Data units traversing the protocol stack are stored in memory 608. Memory 608 may comprise one or more memory devices through which data units pass between the media transceiver and a source or destination application, and may be implemented as one or more random access memory devices, static or dynamic, volatile or non-volatile.

In one operational example, transceiver 602 may receive a data block off the media, and notify the host processor 604 of the reception. The received data block may be transferred into RAM 608 and the host processor 604 may build descriptors in RAM 608 for use by Protocol DMA Engine 606 in data link layer processing. When host processor 604 determines that a data unit transfer to a next layer is appropriate, the descriptor list may be passed to the Protocol DMA Engine 606 for execution. The Protocol DMA Engine may write the resultant output data unit into the same or a different memory device than the memory device from which the input data unit was read. The host processor 604 may be notified when Protocol DMA Engine 606 processing is complete and next layer processing may ensue.

Figure 7:
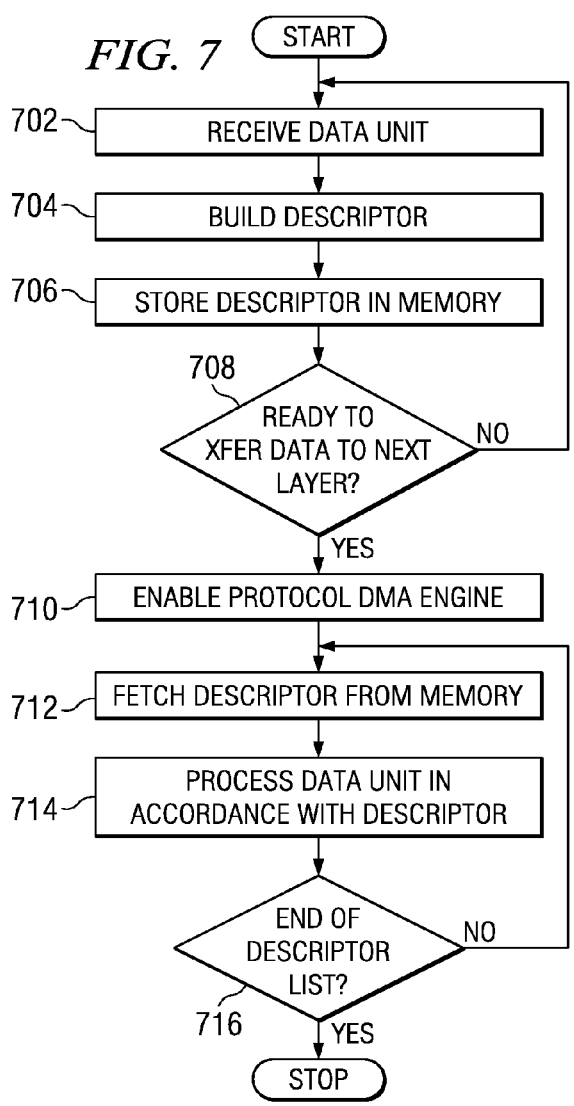
FIG. 7 shows a flow diagram for a method employing the Protocol DMA Engine to accelerate protocol processing in accordance with preferred embodiments of the invention.

FIG. 7 shows a flow diagram for a method employing the Protocol DMA Engine to accelerate protocol stack processing in accordance with preferred embodiments of the invention. In block 702, a data unit is received in a protocol layer initiating Protocol DMA Engine processing, and the data unit is stored in memory. The host processor parses the data unit to determine its content and, in block 704, builds a set of descriptors representing the operations the Protocol DMA Engine is to perform in processing the data unit, i.e. to construct a next layer data unit. These operations include a variety of manipulations and data movements required by the protocol layers processed by the Protocol DMA Engine, for example, decryption, reassembly, and decompression. The descriptors are stored in memory accessible to the Protocol DMA Engine in block 706.

In block 708, the host processor determines whether a transfer to a next layer, including the data unit received in block 702, should be performed. If the data is not ready to be transferred, the host processor waits for more data to be received in block 702. If the data is ready to be transferred, the host processor passes the descriptor list to the Protocol DMA Engine, in block 710, enabling processing of the data associated with the descriptors.

The Protocol DMA Engine fetches a descriptor from memory in block 712, and processes data in accordance with the descriptor in block 714. Processing is complete when the descriptor at the tail of the descriptor linked list is executed. If descriptors remain to be executed, processing continues in block 712. When the last descriptor in the linked list of descriptors is executed, the Protocol DMA Engine notifies the host processor that processing is complete. Protocol processing continues in a next layer.

Figure 8:
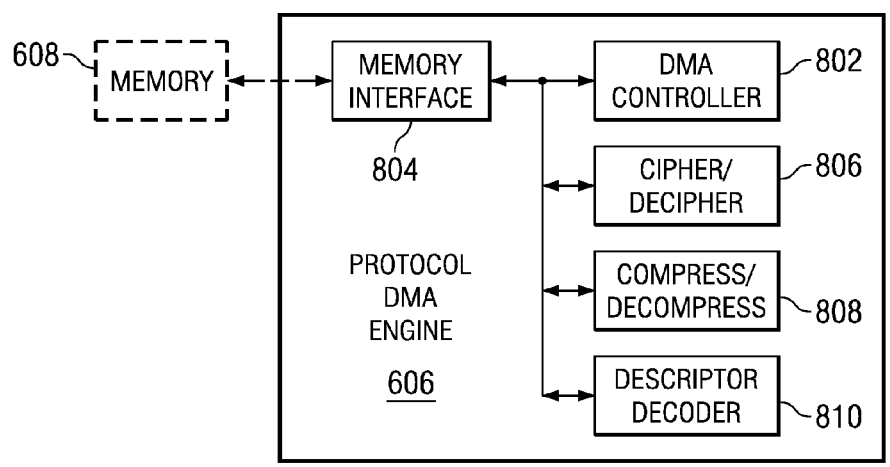
FIG. 8 shows an illustrative Protocol DMA Engine in accordance with preferred embodiments of the invention.

FIG. 8 shows an illustrative Protocol DMA Engine 606 in accordance with preferred embodiments of the invention. Protocol DMA Engine 606 comprises a memory interface 804 that allows access to the memory 608. The memory 608, which may comprise one or more memory devices, contains data units to be processed and descriptors directing data unit processing. The host processor 604 builds descriptors as data units flow into the pertinent protocol stack layer. The descriptors are written into the memory 608 and Protocol DMA Engine 606 processing is triggered when sufficient data units are received at the data link layer to construct a next layer data unit.

A Direct memory access ("DMA") controller 802 is coupled to the memory interface 804. The DMA controller 804 performs the data movement operations required by data link layer processing. Segmentation and reassembly are supported by scatter/gather capability and further supported by chained DMA operations involving the descriptor linked lists. Moreover, unaligned transfer capability allows the DMA controller 804 to construct misaligned fields in a data unit or to realign a data unit as needed.

A cipher/decipher component 806 is coupled to the memory interface 804. The cipher/decipher component 806 provides for secure data transfers by encrypting and decrypting data units flowing through the protocol stack. The particular encryption and decryption algorithms employed may be protocol or application specific Cipher/decipher component 806 may implement, for example, the encryption and decryption algorithms applied to UMTS systems as specified in 3GPP TS 33.102, Security Architecture, or various digital rights management algorithms.

A compress/decompress component 808 is coupled to the memory interface 804. The compressor/decompressor 808 allows the Protocol DMA Engine to encode and decode data units to make efficient use of channel bandwidth. For example, IP headers may be compressed and decompressed in accordance with RFC2507, RFC3095, or other standards to reduce the bandwidth consumed by transfer of the headers.

A descriptor decoder 810 interprets the fields of the descriptors fetched from memory 608 and directs the operations of the Protocol DMA Engine 606 in accordance with the descriptors.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. While embodiments of the invention have been described in relation to the UMTS standard, the embodiments of the present disclosure is not so limited, and are applicable to networked systems employing a protocol stack. Accordingly, the scope of protection is not limited to the embodiments described herein, but is only limited by the claims which follow, the scope of which shall include all equivalents of the subject matter of the claims.

What is claimed is:

1. A method comprising:
    building in a host processor a set of descriptors that describe the operations to be performed by a Protocol Direct Memory Access Engine, the host processor building the set of descriptors in lieu of performing the operations described by the descriptors;
    providing the set of descriptors to the Protocol Direct Memory Access Engine;
    processing a protocol layer input data unit by means of the Protocol Direct Memory Access Engine by applying either compression or decompression to at least a portion of the protocol layer input data unit whereby the Protocol Direct Memory Access Engine executes the operations described in the set of descriptors to produce a protocol layer output data unit; and
    providing the protocol layer output data unit to a next layer of a network protocol stack.

2. The method of claim 1, further comprising building a set of descriptors that control the operation of a Protocol Direct Memory Access Engine, the information contained in the descriptors comprising:
    an input data unit location,
    processing steps to be applied to the input data unit to produce the output data unit, and
    an output data unit location.

3. The method of claim 1, further comprising building a set of descriptors that control the operation of a Protocol Direct Memory Access Engine, the information contained in the descriptors comprising:
    an input data unit location,
    processing steps to be applied to the input data unit to produce the output data unit,
    an output data unit location, and
    metadata to be applied by the processing steps.

4. The method of claim 1, further comprising building a set of descriptors that control the operation of a Protocol Direct Memory Access Engine, the information contained in the descriptors comprising:
    an input data unit location,
    processing steps to be applied to the input data unit to produce the output data unit,
    an output data unit location, and
    the location of a next descriptor to process in the set of descriptors.

5. The method of claim 1, further comprising enabling the Protocol Direct Memory Access Engine to process the input data unit when sufficient input data units are received to produce the output data unit.

6. The method of claim 1, further comprising enabling the Protocol Direct Memory Access Engine to process the set of descriptors, wherein the set of descriptors direct the Protocol Direct Memory Access Engine to perform operations corresponding to at least a sub-layer of a protocol stack.

7. The method of claim 1, further comprising processing a protocol layer input data unit by transferring at least a portion of the protocol layer input data unit directly into a protocol layer output data unit.

8. The method of claim 1, further comprising processing a protocol layer input data unit by either ciphering or deciphering at least a portion of the protocol layer input data unit.

9. A system comprising:
    a Protocol Direct Memory Access Engine that processes a protocol layer input data unit by either compressing or decompressing at least a portion of the input data unit to produce a protocol layer output data unit;
    a host processor that produces a descriptor, wherein the descriptor describes the operations to be performed by the Protocol Direct Memory Access Engine to produce the protocol layer output data unit from the protocol layer input data unit.

10. The system of claim 9, wherein the Protocol Direct Memory Access Engine transfers data directly from the input data unit to the output data unit.

11. The system of claim 9, wherein the Protocol Direct Memory Access Engine either ciphers or deciphers at least a portion of the input data unit to produce the protocol layer output data unit.

12. The system of claim 9, further comprising a memory coupled to the host processor and coupled to the Protocol Direct Memory Access Engine; wherein the memory stores the descriptors produced by the host processor.

13. The system of claim 9, further comprising a memory coupled to the Protocol Direct Memory Access Engine and coupled to the host processor; wherein the memory stores the protocol layer input data unit processed by the Protocol Direct Memory Access Engine to produce the protocol layer output data unit.

14. The system of claim 9, wherein the Protocol Direct Memory Access Engine is configured to perform data link layer processing.

15. The system of claim 9, further comprising a transceiver coupled to the host processor; wherein the transceiver accesses a wireless network.

* * * * *